United States Patent [19]

Winkler

[11] 4,212,170
[45] Jul. 15, 1980

[54] CRYOPUMP

[75] Inventor: Otto Winkler, Fürstentum, Liechtenstein

[73] Assignee: Oerlikon Buhrle USA Incorporated, Hudson, N.H.

[21] Appl. No.: 30,098

[22] Filed: Apr. 16, 1979

[51] Int. Cl.² ........................................... B01D 5/00
[52] U.S. Cl. ........................................ 62/55.5; 62/268; 62/514 R; 55/269
[58] Field of Search ............... 62/55.5, 45, 100, 268, 62/514 R; 417/901; 55/269

[56] References Cited

U.S. PATENT DOCUMENTS

| 3,321,927 | 5/1967 | Hood, Jr. | 62/55.5 |
| 3,364,654 | 1/1968 | Westbrock | 62/55.5 |
| 3,423,947 | 1/1969 | Moriya | 62/55.5 |
| 3,485,054 | 12/1969 | Hogan | 62/55.5 |
| 3,721,101 | 3/1973 | Sheppard et al. | 62/55.5 |

*Primary Examiner*—Ronald C. Capossela
*Attorney, Agent, or Firm*—John E. Toupal

[57] ABSTRACT

Disclosed is a multiple stage cryogenerator including a cryopump system in which a thermally conductive bridge between a pumping assembly and a low temperature stage is somewhat lengthened in order to reduce the length of a conductive bridge between a higher temperature stage and a radiation shield for the pumping assembly. The thermal gains produced by reducing the length of the latter bridge outweighs considerably the thermal losses caused by lengthening the first bridge so as to substantially improve the overall thermal efficiency of the system.

15 Claims, 3 Drawing Figures

CRYOPUMP

BACKGROUND OF THE INVENTION

Cryopumps are used extensively for the creation of high vacuum. In those technical vacuum processes entailing a reduction in pressure to a high vacuum, cryopumping systems usually include a cryogenerator in which helium gas is used as a cooling medium. The helium gas circulates in a closed circuit between the generator and a helium compressor connected by flexible high pressure lines. Most often, a Sterling or a Gifford-Mac Mahon process is used, either of which provide in two stages the condensation temperatures of 15°–20° K. necessary for the production of high vacuum. A unique advantage of cryopumping systems is that in connection with certain sorption media they can lower the partial pressure of hydrogen to satisfactorily low values.

Primary disadvantages of cryopumping systems are high equipment and operating costs compared to other methods of vacuum production. One way of reducing these costs is to improve the thermal efficiency of the pumping process. Normally, only a small portion of the expended thermal energy is used for condensing pumped gases. The major portion is used to lower the heat of the cryopump and is then lost to the environment by radiation. Thus, a substantial improvement in thermal efficiency can be achieved by reducing radiation losses. Obviously, a reduction in losses can be obtained by diminishing the condensation surface area exposed to radiation. However, that approach also leads to a reduction in pumping capacity and is therefore not a viable solution. Another known disadvantage of cryopumping systems is the start-up time required to reach operating temperatures. Typically, this time is greater than that required by comparable diffusion pump systems. This problem also results in large measure from the reduced thermal efficiency caused by radiation heat losses.

A common method of reducing radiation losses in cryogenerator systems entails the use of radiation shields for the low temperature condensation surfaces that are used to pump permanent gases. The radiation shield is generally cooled by the higher temperature stage of the cryogenerator so as to establish an intermediate temperature barrier. Typically, the radiation shield includes a chevron baffle with a high conductance for the permanent gases that are to be pumped. Unfortunately, the radiation shields themselves experience large radiation heat losses that seriously diminish the thermal efficiency of the system.

The object of this invention, therefore, is to provide an improved cryogenerator including a cryopump system with reduced radiation heat losses and correspondingly greater thermal efficiency.

SUMMARY OF THE INVENTION

The invention is a cryopump system including a multiple stage cryogenerator that circulates refrigerant to low and lower heat sinks located within a vacuum chamber; a cryopump surface means thermally connected to the lower temperature sink; a radiation shield enclosure supported by the low temperature sink, enclosing the surface means and defining an inlet opening for gas conductance; a baffle assembly obstructing direct rectilinear paths through the opening; and a heat conductive bridge directly connecting the baffle to the low temperature sink. Connecting the baffle assembly directly to the low temperature sink substantially reduces the total mass required for both the shield enclosure and baffle assembly thereby reducing the thermal radiation losses of the system.

In a preferred embodiment of the invention, the inlet opening is annular, the shield enclosure comprises one portion that defines both the outer periphery of the inlet opening and a primary volume retaining the cryopumping surface means and another portion that defines both the inner periphery of the inlet opening and a secondary volume retaining the lower temperature sink, and the primary and secondary volumes are located on opposite sides of the inlet opening. Preferably, the cryopumping surface means comprises a multiple panel assembly supported from the lower temperature sink by elongated rods that are formed of a highly thermally conductive material such as pure copper or silver. Although this arrangement results in a somewhat larger conductive path between the cryopump panel assembly and the lower temperature sink, the associated reduction in thermal efficiency is relatively minor because of the significantly greater conductivity of the connecting rods at their extremely low operating temperatures. This small reduction in efficiency is more than compensated by the increase in thermal efficiency established by the modified radiation shield and baffle structure.

One feature of the invention is the construction of the radiation shield from a stiff base material such as stainless steel plated with a less stiff material with greater heat conductivity such as copper or silver. This combination of materials provides the desired heat conductivity while permitting a reduction in overall mass and associated radiation heat loss.

Another feature of the invention is the provision of a separate vessel in thermal contact with each of the cryopump panel and baffle assemblies. The vessels are adapted to contain, respectively, liquid hydrogen and liquid nitrogen and are supplied by gas lines that extend through the walls of the vacuum chamber. During transient periods of increased thermal load, the refrigerant filled vessels assist the cryogenerator to prevent saturation and possible backstreaming into the vacuum chamber.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
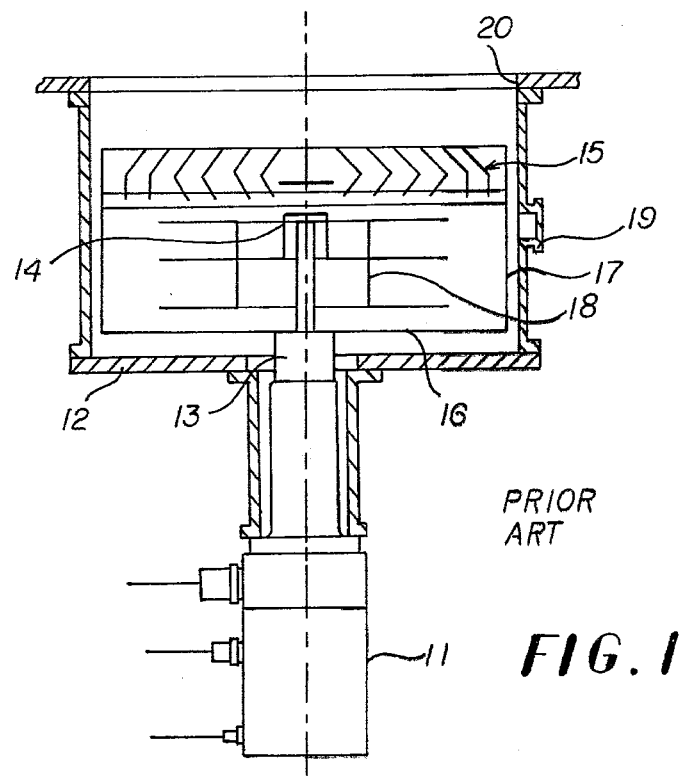
FIG. 1 is a schematic partial cross-sectional view of a prior cryopumping system.

Illustrated in FIG. 1 is a conventional cryopump system including a cryogenerator 11 mounted on a base plate 12 of a vacuum installation. A first stage heat sink 13 of the cryogenerator 11 is typically in a temperature range between 80°–120 K. while a second stage heat sink surface 14 is in a range between 15°–20° K. Power consumption of the low temperature stage 14 can be, for example, approximately 2 watts at 19° K. and the comparable power consumption of the higher temperature stage 13 would be approximately 100 watts.

Pumping of permanent gases is provided by the cryopanel assembly 18 that is in thermal contact with the low temperature stage 13. The assembly 18 is enclosed by a radiation shield consisting of a baffle 15 composed of circular concentric chevron plates, a polished cylinder 17, and a circular bottom plate 16 in thermal contact with the higher temperature stage 13. The baffle 15 is connected to the higher temperature stage 13 only by the plate 16 and cylinder 17 which establish a heat conductive path therebetween. Typically, the cryosurface assembly 18 has fins, the insides of which are coated with an absorption medium such as activated charcoal for the absorption of hydrogen. A flange 19 is provided for connection to a roughing pump (not shown) which is only used for start-up.

With a suction opening 20 of 500 mm. diameter the weight of the mass to be cooled at the higher temperature of the stage 13 is approximately 20 kg. and the mass cooled to the lower temperature of the stage 14 is approximately 4 kg. Because of the large masses involved, a typical cool-down time of about two hours is required to reach equilibrium temperatures. During this time cooling power consumption is greater than thereafter. Obviously the cooling down time and power consumption could be reduced by reducing the mass being cooled. This would be accomplished by reducing the lengths of the heat conductive bridges between the stages 13 and 14, respectively, and the assemblies 15 and 18. The present invention significantly reduces the bridge between the shield assembly and the higher temperature stage at the expense of the bridge between the low temperature stage and the cryopump surfaces which bridge is somewhat lengthened. Prior innovators have been reluctant to increase the length of the latter bridge. It was believed that such action would produce a temperature gradient of a few degrees, considerably increase the cryotemperature and result in a desorption and re-evaporation of condensed gases. However, the heat conduction of pure copper at 20° K. is 20 times higher than at room temperature and still 13 times higher than at 100° K. Therefore, efficient bridges of large cross section are not as necessary for the low temperature as for the higher temperature stage used for radiation shielding. According to this invention a comparable overall temperature distribution is obtained with considerably less material. A 50 percent shortening of the heat bridge to the radiation baffle allows a 75 percent reduction of material and a resultant reduced heat capacity requirement for the same temperature differential. Accordingly, the cooling time required for the radiation shield is shortened. On the other hand, a lengthening of the heat bridge to the cryopanel pumping assembly produces a heat capacity increase of only about 20 percent and an increase of the temperature differential of only 0.40° K. at 2 watts cooling power.

Figure 2:
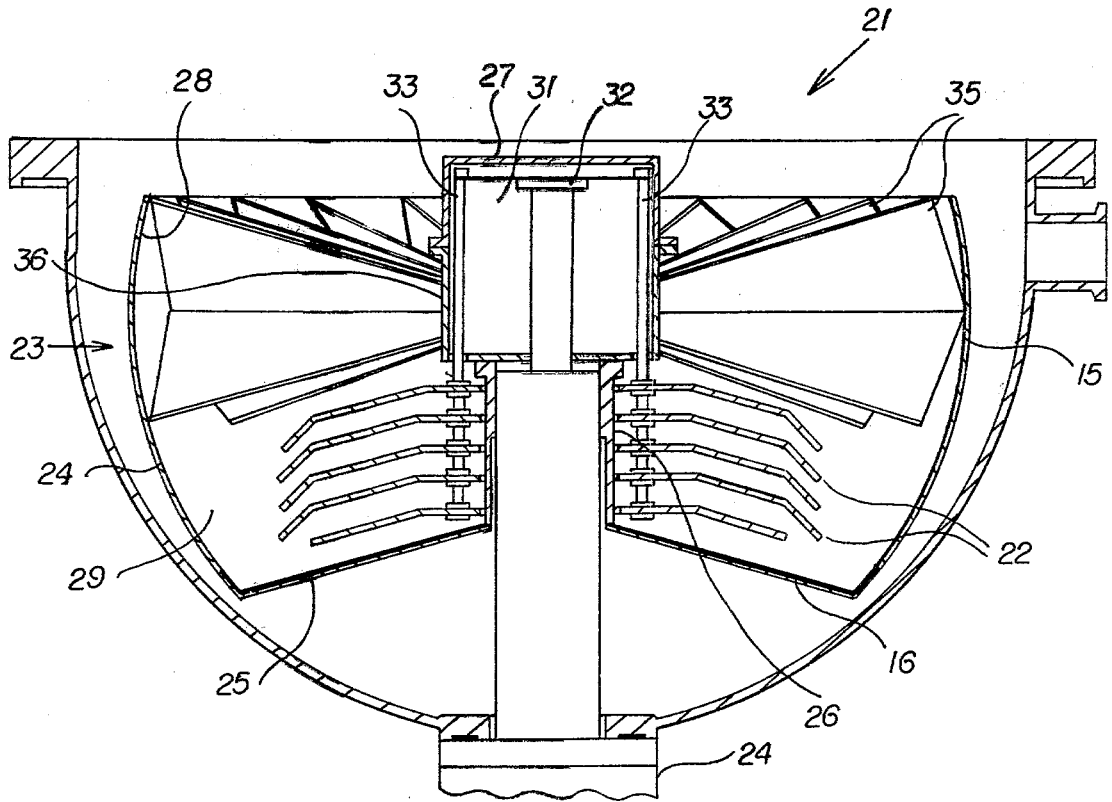
FIG. 2 is a schematic partial cross-sectional view of a cryopumping system according to the invention.

FIG. 2 shows a cryopump system 21 according to this invention. Shown are a plurality of cryopump surfaces 22, for example, of silver-sheet material and in a conical shape for stiffening purposes. A radiation shield enclosure 23 includes a spherical shell portion 24 closed by a conical bottom plate 25 connected to a low temperature stage heat sink 26 of a cryogenerator 24. Also included in the enclosure 23 is a central inverted cup portion 27. The enclosure 23 defines an annular inlet opening 28 that is straddled by a primary volume 29 within the shell 24 and secondary volume 31 within the cup portion 27.

The surfaces 22 are connected with a lower temperature stage heat sink 32 of the cryogenerator 24 by a plurality of thin copper rods 33 about 6 mm. in diameter. As shown, the cryopump surface assembly 22 is located in the primary volume 29 and the lower temperature heat sink 32 is within the secondary volume 31 on opposite sides of the inlet opening 28. Obstructing direct rectilinear paths to the primary volume 29 is a baffle assembly consisting of radially oriented chevrons 35 in the inlet opening 28. The baffle assembly 35 is directly connected to the low temperature heat sink 26 by a cylindrical heat conductive bridge 36 mated with the cup portion 27. To avoid extreme temperature differentials, the sphere portion 24 is preferably made from a base material of high stiffness such as stainless steel with which a thickness of a few tenths mm. is satisfactory to obtain the required stiffness. To assure sufficient heat conduction a copper plating of 1/100 mm. thickness is applied on both sides of the base material. The combination of a material of high stiffness and low heat conductivity with a metal of low stiffness but high heat conductivity permits a considerable reduction in the masses to be cooled where the heat conduction is limited by the strength requirements of the cross section. This technique can also be used for the fabrication of the cryopanels 22. Here a 1/100 mm. thick copper foil is applied over cold rolled stainless steel.

Figure 3:
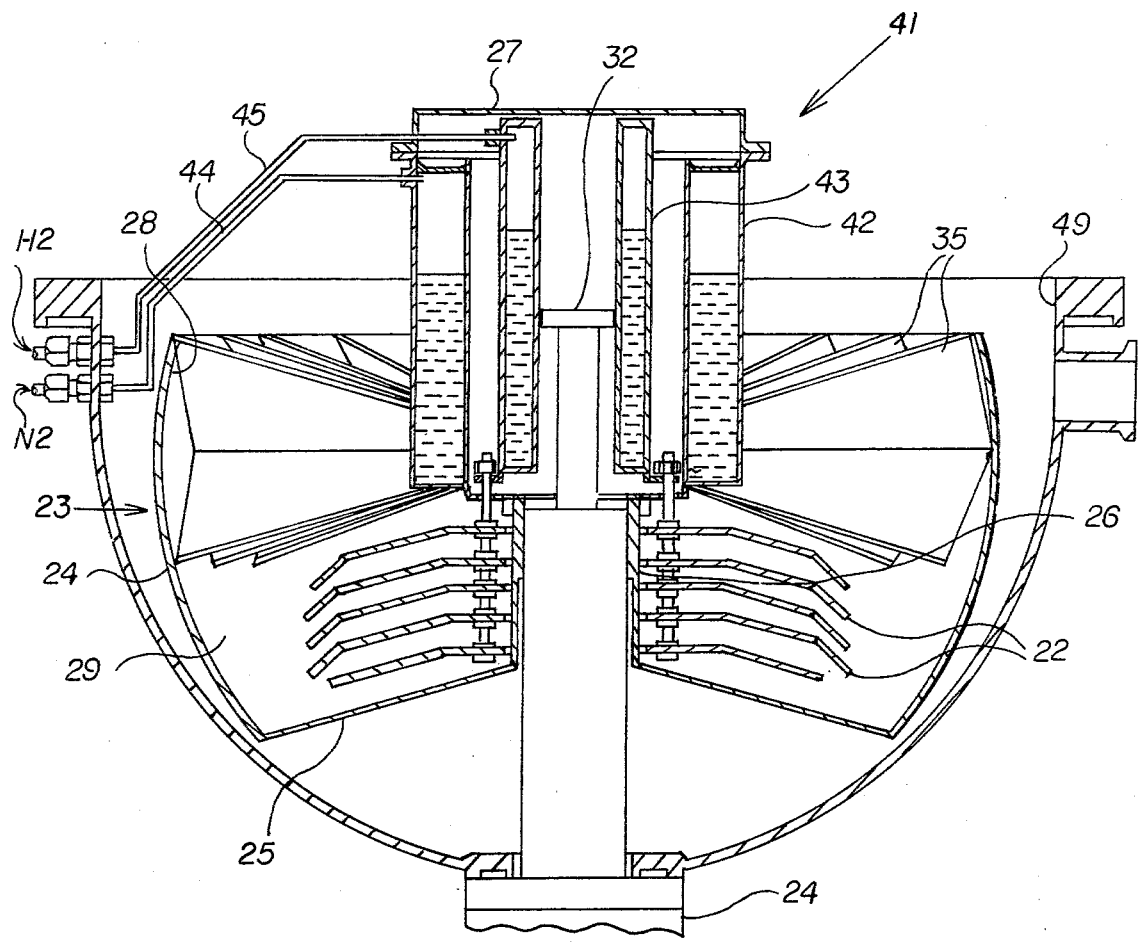
FIG. 3 is a schematic partial cross-sectional view of a modified cryopumping system embodiment of the invention.

A disadvantage can occur with the embodiment 21 when radiation losses suddenly exceed the cooling capacity of the cryogenerator 24. In that case the temperature of the baffle chevrons 35 can climb faster than those in conventional systems with larger masses and, therefore, higher heat capacity. This disadvantage is alleviated by an embodiment shown in FIG. 3. As illustrated, an outer annular vessel 42 is in thermal contact with the low temperature heat sink 26 and an inner annular vessel 43 is in thermal contact with the lower heat sink 32. Fluid communication to the vessels 42 and 43 is provided, respectively, by a pair of gas lines 44 and 45. The vessels 42 and 43 are filled with an appropriate cooling agent in order to have additional cooling in the case of higher rate of radiated heat or gas condensation. Gases are supplied through the lines 44 and 45 and condense in the vessels 42 and 43. The pressure and type of the cooling agents used are determined as follows: When the normal work temperature of the cryosurfaces 22 and 35 are too low; i.e., below 100° K. on the higher temperature stage and below 20° K. on the lower temperature stage, the condensation and storage of the cooling agents begin. In this way, additional cooling agent capacity is provided during perods when the system is in use but not pumping.

The embodiment 41 can be used at even higher pressures than embodiment 21. For example, the rough pumping cycle can be shortened and cross-over can be accomplished at a few mbar without cryopump saturation and therefore no backstreaming to the vacuum system will occur. It is also possible for the cryopump to intercept a higher radiation. This is very important, for example, for coating and metallurgical processes. In addition, the radiation shield 23 of the cryopump 41 can be provided with higher conductance for gases in order to accomplish a higher pumping capacity. In that way a shorter cool-down time is retained with a prescribed cooling capacity for pump cycling. Thus, the embodiment 41 provides in general a greater pumping speed and a greater pumping capacity.

If nitrogen is used as a cooling medium in the vessel 42 and hydrogen is used as a cooling agent for the vessel 43, a condensation temperature of 100° K. of nitrogen corresponds to a pressure of about 10 bar and a condensation temperature of 20° K. of hydrogen corresponds to a pressure of about 1 bar. The volumes of the vessels 42 and 43 are determined by the pump opening 49. For a diameter of 500 mm., the volume of vessel 43 would be a little more than 0.5 liter. In order to fill the vessel a hydrogen gas supply at 1 bar of 400 liters would be required. The larger storage vessel 42 would have a volume of a little more than 1.5 liters. This corresponds to a nitrogen gas supply of about 100 liters at 10 bar.

Through evaporation of 1.5 liters of liquid nitrogen an additional refrigeration capacity of about 135 watts can be produced within 30 minutes. Within that same time, at the lower temperature level, an additional refrigeration capacity of about 1 watt can be obtained with 0.5 liter hydrogen. By fabricating the vessel 43 from 0.1 mm. thick stainless steel sheet plated with 0.01 mm. thick copper for increased temperature conductivity, the temperature capacity and therefore the cooldown time before liquification of the hydrogen will be no greater than required for the embodiment 21 of FIG. 2. Because of the higher pressure involved, a thicker material (for example 1 mm. copper sheet) should be used for fabricating the vessel 42. This will increase the mass by only 25 percent in the higher temperature stage, which increase is insignificant in comparison to the overall weight reduction achieved.

Obviously, many modifications and variations of the present invention are possible in light of the above teachings. It is to be understood, therefore, that the invention can be practiced otherwise than as specifically described.

What is claimed is:

1. A high vacuum cryopump apparatus comprising:
   a vacuum chamber means;
   a multiple stage cryogenerator means comprising a low temperature heat sink means and a lower temperature heat sink means both located within said chamber means;
   cryopump surface means located within said chamber means in heat conducting contact with said lower temperature heat sink means;
   a radiation shield enclosure means located within said chamber means and enclosing both said cryopump surface means and said lower temperature heat sink means, said shield enclosure means being supported by said low temperature sink means and defining an inlet opening permitting gas conductance between said chamber and said cryopump surface means;
   baffle means located in said inlet opening and being shaped and arranged so as to obstruct all direct rectilinear paths between said chamber means and said cryopump surface means; and
   heat conductive bridge means directly connecting said baffle means to said low temperature heat sink means so as to provide a good thermally conductive path therebetween.

2. An apparatus according to claim 1 wherein said inlet opening is annular, said shield enclosure means comprises one portion that defines both the outer periphery of said inlet opening and a primary volume and a second portion that defines both the inner periphery of said inlet opening and a secondary volume, said primary and secondary volumes are located on opposite sides of said inlet opening, said cryopump surface means is located within said primary volume, and said lower temperature sink means is located within said secondary volume.

3. An apparatus according to claim 2 wherein said baffle means comprises a plurality of chevron fin members radially disposed in said inlet opening.

4. An apparatus according to claim 2 wherein said cryopump surface means is thermally connected to said lower temperature heat sink means by a plurality of highly thermally conductive, elongated members.

5. An apparatus according to claim 4 wherein said members are formed of copper.

6. An apparatus according to claim 4 wherein said members are formed of silver.

7. An apparatus according to claim 2 wherein said cryopump surface means and said radiation shield and baffle means comprise a base material having a given stiffness and thermal conductivity and a plating material having less stiffness and greater thermal conductivity.

8. An apparatus according to claim 2 including one vessel in thermal contact with said baffle means, another vessel in thermal contact with said cryopump surface, one gas line providing communication between said one vessel and the exterior of said chamber means, and another gas line providing communication between said another vessel and the exterior of said chamber means.

9. An apparatus according to claim 8 wherein said another vessel is annular and encircles said lower temperature heat sink means, and said one vessel is an annular vessel coaxial with and encircling said another vessel.

10. A cryopump apparatus comprising a multiple stage cryogenerator, a condenser surface for pumping gases, a radiation shield for the condenser surface and thermally conductive bridges connecting with the shield to a low temperature stage and the condenser surface with a lower temperature stage of the cryogenerator and wherein said conductive bridge between said radiation shield and said low temperature stage is shorter than said conductive bridge between said lower temperature stage and said condenser surface.

11. A cryopump apparatus according to claim 10 wherein said radiation shield is supported by said low temperature stage and said condenser surface is connected with said lower temperature stage by heat conducting supports that protrude through said radiation shield.

12. A cryopump apparatus according to claim 10 wherein said supports are made of purest copper.

13. A cryopump apparatus according to claim 10 wherein said supports are made of silver.

14. A cryopump apparatus according to claim 10 wherein said condenser surfaces and said radiation shield are made of a material of high stiffness that is plated with a material of good heat conductivity.

15. A cryopump apparatus according to claim 10 including a cooling medium container connected to said condenser surface, and another cooling medium container connected to said radiation shield.

* * * * *